Figure 1:
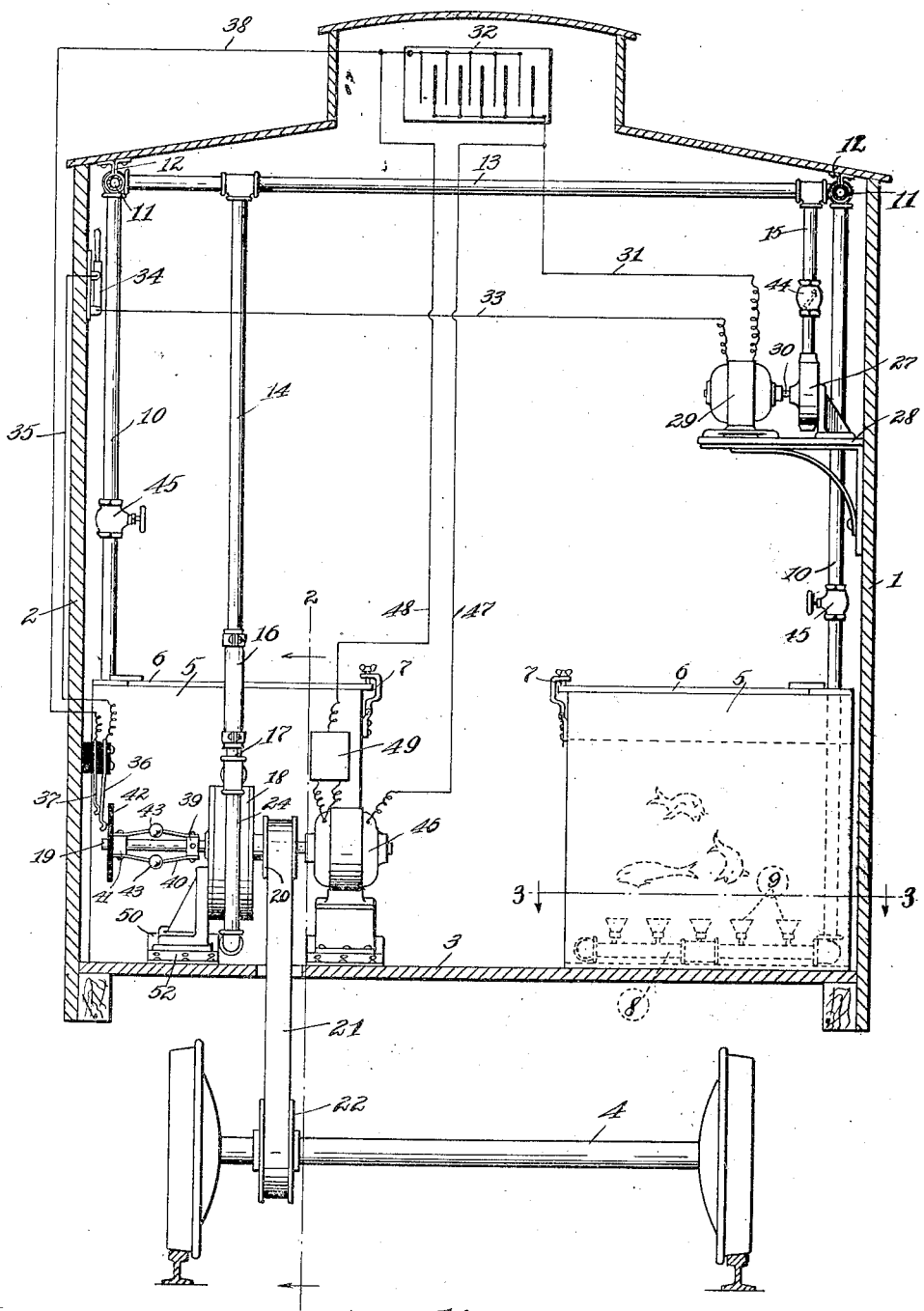

O. ZISTEL.
AERATING APPARATUS.
APPLICATION FILED OCT. 29, 1913.
1,109,193.
Patented Sept. 1, 1914.
2 SHEETS—SHEET 2.
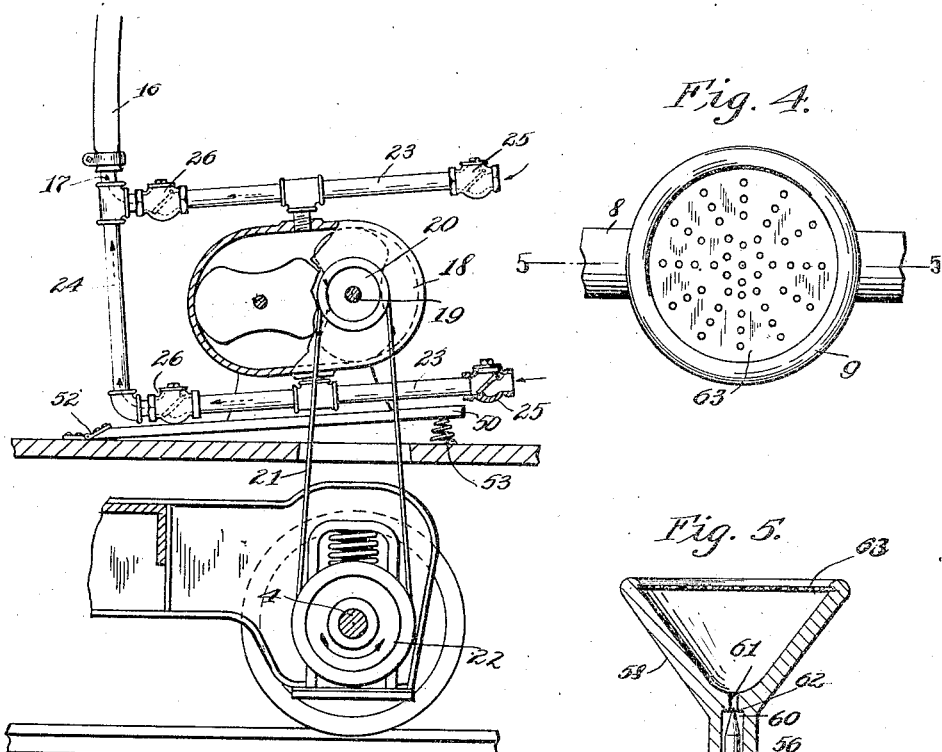
Fig. 2.
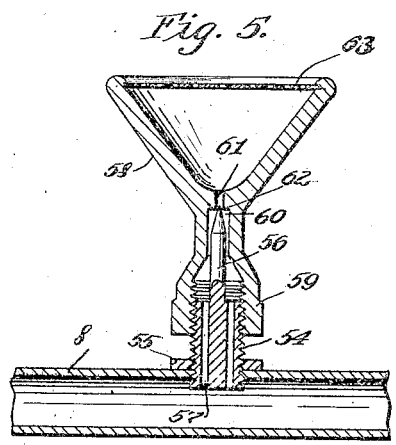
Fig. 4.
Fig. 5.
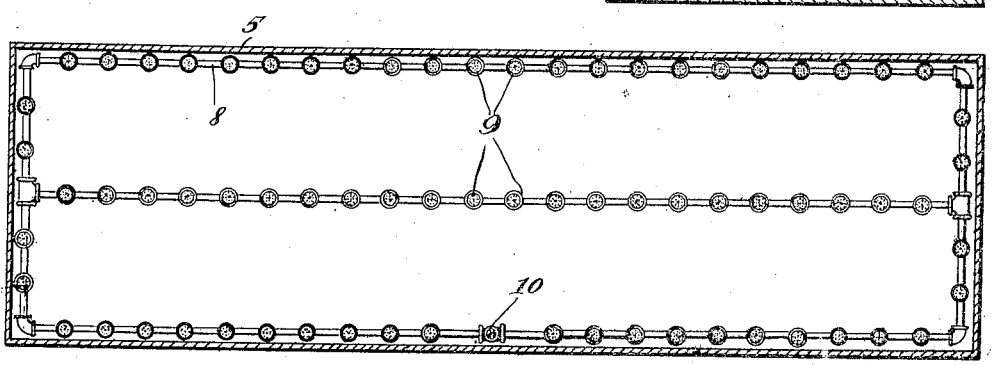
Fig. 3.
WITNESSES:
Robert L. Bruck.
Hugh B. McGill.
INVENTOR,
Oscar Zistel
BY
ATTY'S.

UNITED STATES PATENT OFFICE.

OSCAR ZISTEL, OF SANDUSKY, OHIO.

AERATING APPARATUS.

1,109,193.  Specification of Letters Patent.  Patented Sept. 1, 1914.

Application filed October 29, 1913. Serial No. 797,951.

*To all whom it may concern:*

Be it known that I, OSCAR ZISTEL, a citizen of the United States, residing at Sandusky, in the county of Erie and State of Ohio, have invented a certain new and useful Improvement in Aerating Apparatus, of which the following is a full, clear, and exact description, reference being had to the accompanying drawings.

This invention relates to an apparatus for aerating water contained in fish tanks which are carried by vehicles, and wherein live fish are stored for transportation.

The apparatus of my invention is particularly adapted for use on railway cars which are equipped with tanks for live fish transportation. In such cars, it is necessary to employ comparatively small tanks because of the limitations of the cars, and for reasons of economy, as many fish as possible are placed in each tank. In consequence of these facts, there is insufficient air in the water for the number of fish which are placed in the tanks, and to supply the requisite amount of air, various devices are used. Those devices heretofore used with which I am familiar employ either a gasolene engine for operating an air pump to supply air to the tanks, or the air is supplied direct from the pump located on the engine which is used in connection with the air brake system. The use of the gas engine is now prohibited by practically all of the railway lines because of the presence of the inflammable liquid fuel required for the engine; and the second method of supplying air to the tanks has the disadvantage of making it necessary to keep the car coupled to the engine all the time there are fish in the tank. This use of the engine and its withdrawal from service while the car is "side tracked" for the purpose of loading and unloading it, is the source of considerable expense.

It is the object of my invention to provide an apparatus for use on railway cars of the above class, which derives its motive power from the axle of the car when the car is running in either direction; and which includes an auxiliary pumping device for supplying air to the tanks when the car is standing, or is traveling below a certain speed; and, furthermore, to provide means for automatically placing in operation the auxiliary pumping device when the principal pumping device or that operated from the car axle, is either stopped or is running below a predetermined speed. This and further objects I attain by an apparatus set forth in the following claims and illustrated in the accompanying drawings forming a part hereof wherein—

Figure 1 is a transverse, vertical section through a car provided with my apparatus, certain parts of the electrical equipment being shown diagrammatically, and certain irrelative elements of the car structure being omitted; Fig. 2 is a sectional detail taken on the line 2—2 of Fig. 1 and shows the principal air pump and its driving connection with the axle of the car; Fig. 3 is a horizontal section through one of the fish tanks as indicated by the line 3—3 of Fig. 1; and Figs. 4 and 5 are a plan and central vertical section, respectively, of the air jet employed in the fish tank, the latter figure being taken on the line 5—5 of Fig. 4.

Taking up a detailed description of the invention by the use of reference numerals, 1 and 2 represent the side walls and 3 the floor of the body of a railway car which is supported in the usual manner upon suitable trucks, one of the axles of one of the trucks being shown at 4 (the well known structure of the truck being omitted to afford a clearer illustration of my invention). Upon the floor of the car and near the side walls are placed the fish tanks 5, two of such tanks being shown in the drawings as sufficient to illustrate my invention, although in practice any number may be employed, the number being divided equally along the two side walls of the car. Each of the tanks is provided with a cover 6 which is held in place by clamps 7. Lying upon the bottom of each of the tanks is a frame 8 which is composed of tubing. As will be seen in Fig. 3, this frame is composed, generally, of three longitudinal tubes which extend substantially from end to end of the tank and which have their ends connected by transverse tubes. Projecting upwardly from the various tubes of the frame and spaced a slight distance apart, are nozzles 9 (shown in detail in Figs. 4 and 5) which will be described hereinafter.

Connected preferably to the longitudinal tube of each of the frames 8 which lies nearest the side wall of the car, and at substantially its center, is a pipe 10 which rises upwardly through a hole in the top of the tank to where it has connection with a manifold 11, one of such manifolds extending along each side of the top of the car and being supported from the car top by suitable hangers 12. Connecting the manifolds 11 is a pipe 13 which is provided with depending branches 14 and 15. The lower end of the pipe 14 has connection, through a flexible hose section 16, with the discharge end 17 of air conductors leading from a rotary pump 18 which is of the cycloidal type, the casing of the pump being broken away to show a portion of the interior thereof. These pumps are capable of moving large volumes of air at a comparatively low pressure, and, since it is the quantity of air that is desired in this work, (the pressure produced by these pumps being all that is required for the purpose), the above type of pump is especially suitable for use in connection with my apparatus. These pumps, of course, act in either direction according to the direction of rotation of the shaft, and what would be the outlet side of the pump when the shaft is rotated in one direction would become the inlet if the direction of rotation were reversed. Now, because the shaft 19 of the pump is driven through its pulley 20, the belt 21 and the pulley 22 from the axle 4 of the car truck, it is necessary to provide an arrangement of pipes and valves whereby the flow of air from either side of the pump will be directed toward the tanks, regardless of the direction of rotation of the axle; and this arrangement of pipes and valves constitute, what I have referred to above as the air conductors.

Referring particularly to Fig. 2, each opening of the pump has connection with a substantially horizontal branch pipe 23, one end of each of said branches being connected to a substantially vertical pipe 24. The free end of each of the horizontal branches 23 is fitted with an inwardly opening check valve 25, and between their connections with the pump and their ends which have connection with the vertical pipe 24, the branches 23 are provided with check valves 26 which open toward the pipe 24, thereby permitting air to flow from the pump to the pipe 24 and thence to the outlet 17, said valves 26 also acting to prevent the reversal of such flow.

From the description thus far it will be seen that when the car is traveling in a direction to rotate the axle 4 as indicated by the arrow, the pump will be driven in a direction to draw air in through the lower of the valves 25 and through the right hand end of the lower branch 23 and discharge it through the left hand end of the upper branch 23, through the valve 26 and through the outlet 17 to the pipe 14 from where it is conducted by way of the pipe 13 to the manifolds 11 and thence downwardly through the pipes 10 to the tubular frames 8, escaping through the nozzles 9 into the water contained within the tanks 5. If the car is traveling in the opposite direction, the course of the air through the pump will be reversed, the upper check valve 25 and the lower check valve 26 being actuated to direct the current of air through the course previously described, to the tanks.

To provide for conditions under which either an insufficient amount of air, or no air at all is supplied through the pump 18 as, for instance, when the car is traveling below a predetermined speed, or when it is stopped altogether, I include in my apparatus a second or auxiliary pump of the same type as that just described and indicated at 27. The pump 27 is shown in the drawings as supported by a shelf 28 which is carried by the side wall 1 of the car, and mounted upon the same shelf is an electric motor 29 which has connection, through its shaft 30, with the pump. The electric motor is supplied with current through a wire 31 from a storage battery 32 which may be located at any convenient place on the car. A second wire 33 passes from the opposite side of the motor through a switch 34 and wire 35 to a contact spring 36 which forms one member of a second switch, the other member whereof is formed by a contact spring 37 which is connected through the wire 38 with the opposite side of the storage battery 32. Mounted upon that end of the shaft 19 of the pump 18 which projects toward the side wall 2 of the car is a governor which comprises a collar 39 that is pinned to the shaft and that has connection, through springs 40, with a sliding collar 41. The collar 41 carries a disk 42 which is adapted to bear against the end of the leaf spring 36 and press it against the leaf spring 37. The springs 40 carry governor balls 43 which separate as the speed of the shaft 19 increases and in so doing retract the sleeve 41 and withdraw the disk 42 from the spring 36, permitting the springs 36 and 37 to separate and thus opening the circuit which normally supplies the motor 29 with current. From this it will be seen that when the car is traveling below a predetermined speed or is stopped, the apparatus will continue to operate through the auxiliary pump 27. An upwardly opening check valve 44 is placed within the branch 15 of the pipe 13 to prevent air escaping through the pump 27 while the pump 18 is operating. I also provide the pipes 10 with valves 45 so that any one or a number of the tanks may be cut out of the system at will; and by means of the electric switch 34 the operation of the motor 29 may be stopped when desired.

I have included in my apparatus, means for restoring the battery 32 during the operation of the pump 18 which comprises a generator 46, driven from the shaft 19 of the pump 18 and which has connection to the battery through the wires 47 and 48, the circuit represented by the wires 47 and 48 also including an automatic regulator 49 of any approved type, for opening the circuit when the battery is sufficiently charged.

The pump 18 and the parts associated therewith are mounted upon a platform 50 which has one of its edges hinged at 52 to the floor of the car and its opposite edge supported by any suitable number of springs 53. This provides a yielding support for the pump and generator, and compensates for the vibrations between the body of the car and the truck, assuring the proper tension of the belt 21 at all times.

For convenience, I have shown much of my apparatus conventionally and diagrammatically, and I wish it to be understood that I do not confine myself to the construction illustrated in the drawing further than that required by the terms of the claims.

Returning to the nozzles 9 which have been mentioned hereinbefore and which are illustrated in Figs. 4 and 5, each one comprises a threaded nipple 54 which is arranged to be screwed into one of a number of holes tapped in the tubular frame 8 and the nipple is locked in position by a lock nut 55. A stem 56 having a needle point, projects upwardly from the upper end of the nipple 54 and is central with respect thereto, and extending longitudinally through the nipple on either side of the stem 56 are ports 57. A funnel shaped cup 58 has its downwardly extending portion 59 threaded upon the nipple 54 and the portion 59 is provided with a central bore 60 which has its upper end reduced in diameter at 61 to form a shoulder or seat 62 which coöperates with the tapered upper end of the stem 56 to secure the desired adjustment between the parts, when the portion 59 of the cup 58 is screwed along the nipple 54. By a proper adjustment, the air is caused to issue from the bore 61 into the interior of the cup in a flaring jet or spray, and thus distributed across the underneath surface of a perforated plate 63 which extends across the upper end of a cup 58, it passes through the perforations of the said plate and is introduced into the water in finely divided particles, thereby very thoroughly and effectively aerating the water. The advantage of such a treatment of the air is appreciated when it is considered that, without so thorough a distribution of the air, the same would issue from the jet in a quantity sufficient to produce bubbles of considerable size which would rise immediately to the surface of the water and have only a very slight if, in fact, any aerating effect upon the water.

Having thus described my invention, what I claim is:—

1. Apparatus for transporting fish comprising, in combination, a car and a water tank carried thereby, an air pump, connections for conducting air from the pump to the water within the tank, an electric motor for driving said pump, a storage battery, and means operated by the prime mover of the car for charging said battery.

2. Apparatus for transporting fish, comprising, in combination, a car and a water tank carried thereby, a pump carried by the car, connections for conducting air from the pump to the water within the tank, an electric motor for driving said pump, a storage battery carried by the car from which the motor receives its current, and a generator operatively connected to the car axle for charging the battery.

3. Apparatus for transporting fish, comprising, in combination, a car and a water tank carried thereby, a pump, connections for conducting air from the pump to the water within the tank, driving means between the car axle and the pump, an auxiliary pump, connections for conducting air from the last mentioned pump to the water within the tank, an electric motor for operating the auxiliary pump, a source of electric energy carried by the same car for supplying current to said motor, and means for automatically connecting said source to said motor when the car speed falls below a predetermined rate.

4. The combination with a vehicle having an axle and a water tank carried by the vehicle, of a pump, connections for conducting air from the pump to the water within the tank, driving means between the axle and the pump, an auxiliary pump, connections for conducting air from the last mentioned pump to the water within the tank, an electric motor for driving the auxiliary pump, a source of electric energy carried by the vehicle, a circuit including the motor, the source of electric energy, and a switch, and a governor operated by the first mentioned pump for actuating the switch to close the aforesaid circuit when the speed of said pump falls below a predetermined point.

In testimony whereof, I hereunto affix my signature in the presence of two witnesses.

OSCAR ZISTEL.

Witnesses:
BRENNAN B. WEST,
HUGH B. MCGILL.